(12) United States Patent
Kanamaru

(10) Patent No.: US 10,367,971 B2
(45) Date of Patent: Jul. 30, 2019

(54) IMAGE PROCESSING APPARATUS DETECTING TONER PEELING AREA ON CREASE IN DOCUMENT AND CORRECTING PIXEL DATA

(71) Applicant: KYOCERA Document Solutions Inc., Osaka (JP)

(72) Inventor: Kazuhiro Kanamaru, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/746,754

(22) PCT Filed: Jul. 15, 2016

(86) PCT No.: PCT/JP2016/070970
§ 371 (c)(1),
(2) Date: Jan. 22, 2018

(87) PCT Pub. No.: WO2017/018244
PCT Pub. Date: Feb. 2, 2017

(65) Prior Publication Data
US 2018/0213121 A1    Jul. 26, 2018

(30) Foreign Application Priority Data

Jul. 30, 2015  (JP) ................. 2015-151350

(51) Int. Cl.
| | |
|---|---|
| *H04N 1/38* | (2006.01) |
| *H04N 1/40* | (2006.01) |
| *H04N 1/409* | (2006.01) |
| *G03G 15/00* | (2006.01) |

(52) U.S. Cl.
CPC ............. *H04N 1/4097* (2013.01); *H04N 1/38* (2013.01); *H04N 1/40* (2013.01); *G03G 15/00* (2013.01)

(58) Field of Classification Search
CPC .... H04N 1/387; H04N 1/40093; H04N 1/407; H04N 1/4072; H04N 1/409; H04N 1/4097; H04N 1/00726; H04N 1/00801; H04N 1/00816; H04N 1/00827; H04N 1/04;
(Continued)

(56) References Cited

U.S. PATENT DOCUMENTS

| | | | |
|---|---|---|---|
| 6,393,161 B1 * | 5/2002 | Stevenson | G06T 5/20 358/461 |
| 9,282,220 B2 * | 3/2016 | Song | H04N 1/58 |
| 9,554,014 B2 * | 1/2017 | Eguchi | H04N 1/4097 |

(Continued)

FOREIGN PATENT DOCUMENTS

| | | | |
|---|---|---|---|
| JP | 2003122146 A | * | 4/2003 |
| JP | 2004-274705 | | 9/2004 |

*Primary Examiner* — Scott A Rogers

(57) ABSTRACT

A crease detecting unit 13 detects a crease in a document image. A toner peeling detecting unit (a) detects as a toner peeling part a pixel area on the crease, the pixel area (a1) having a width of the predetermined number of pixels in a direction perpendicular to the crease, (a2) having a background color, and (a3) of which both sides are adjacent to at least two pixels in a direction perpendicular to the crease, the at least two pixels having a color other than the back ground color, and (b) corrects a pixel value of the toner peeling part on the basis of pixel values of at least two pixels adjacent to both sides of the pixel area.

5 Claims, 7 Drawing Sheets

(58) Field of Classification Search
CPC .. H04N 1/0402; H04N 1/0408; H04N 1/0411; H04N 1/0414; H04N 2201/0434
See application file for complete search history.

(56) References Cited

U.S. PATENT DOCUMENTS 9,667,832 B2* 5/2017 Kanamaru ........... H04N 1/4097
2018/0295256 A1* 10/2018 Yasaki ................. H04N 1/4097

* cited by examiner

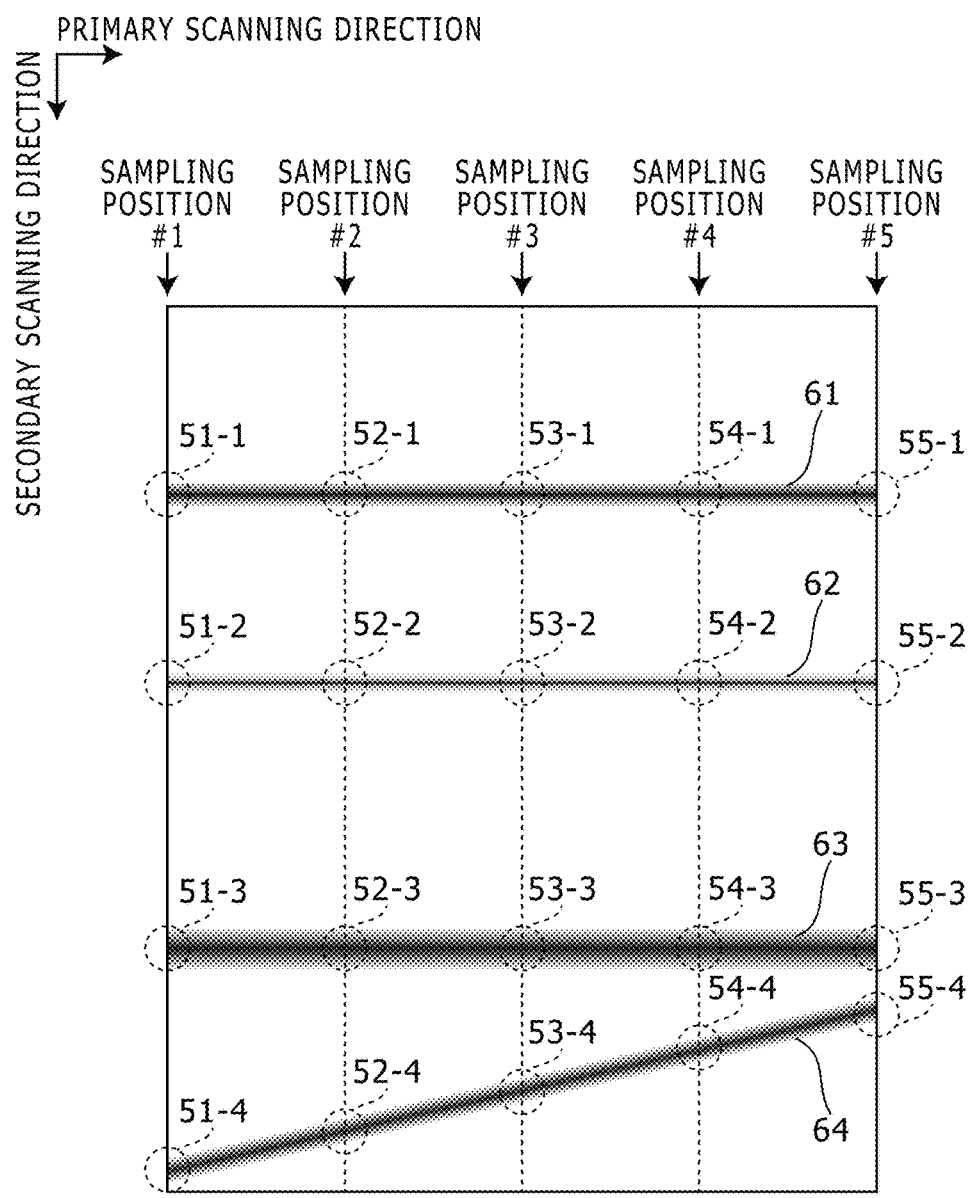

IMAGE PROCESSING APPARATUS DETECTING TONER PEELING AREA ON CREASE IN DOCUMENT AND CORRECTING PIXEL DATA

TECHNICAL FIELD

The present invention relates to an image processing apparatus.

BACKGROUND ART

An image processing apparatus corrects a distorted document image scanned from a book document (for example, see PATENT LITERATURE #1).

CITATION LIST

Patent Literature

PATENT LITERATURE #1: Japanese Patent Application Publication No. 2004-274705.

SUMMARY OF INVENTION

Technical Problem

When folding a sheet-shaped printed matter made by fixing toner in an electrographic manner, the toner may be peeled at a folding position. When scanning an image of such printed matter, a toner peeling part appears in an object drawn with toner such as a character or a figure in the scanned image. In the aforementioned image processing apparatus, such toner peeling part is not corrected.

The present invention has been conceived in order to solve this problem and provide an image processing apparatus that corrects a toner peeling part that appears on a crease in a document image.

Solution to Problem

An image processing apparatus according to the present invention includes: a crease detecting unit that detects a crease in a document image; and a toner peeling detecting unit that (a) detects as a toner peeling part a pixel area on the crease, the pixel area (a1) having a width of the predetermined number of pixels in a direction perpendicular to the crease, (a2) having a background color, and (a3) of which both sides are adjacent to at least two pixels in a direction perpendicular to the crease, the at least two pixels having a color other than the back ground color, and (b) corrects a pixel value of the toner peeling part on the basis of pixel values of at least two pixels adjacent to both sides of the pixel area.

Advantageous Effect of Invention

According to the present invention, in a document image, a toner peeling part that appears on a crease is corrected.

These and other objects, features and advantages of the present invention will become more apparent upon reading of the following detailed description along with the accompanied drawings.

BRIEF DESCRIPTION OF DRAWINGS

FIG. 7 shows a diagram that indicates an example of a specific local gradation detected in the document image shown in FIG. 6.

DESCRIPTION OF EMBODIMENTS

Hereinafter, an embodiment of the present invention will be explained with reference to drawings.

Figure 1:
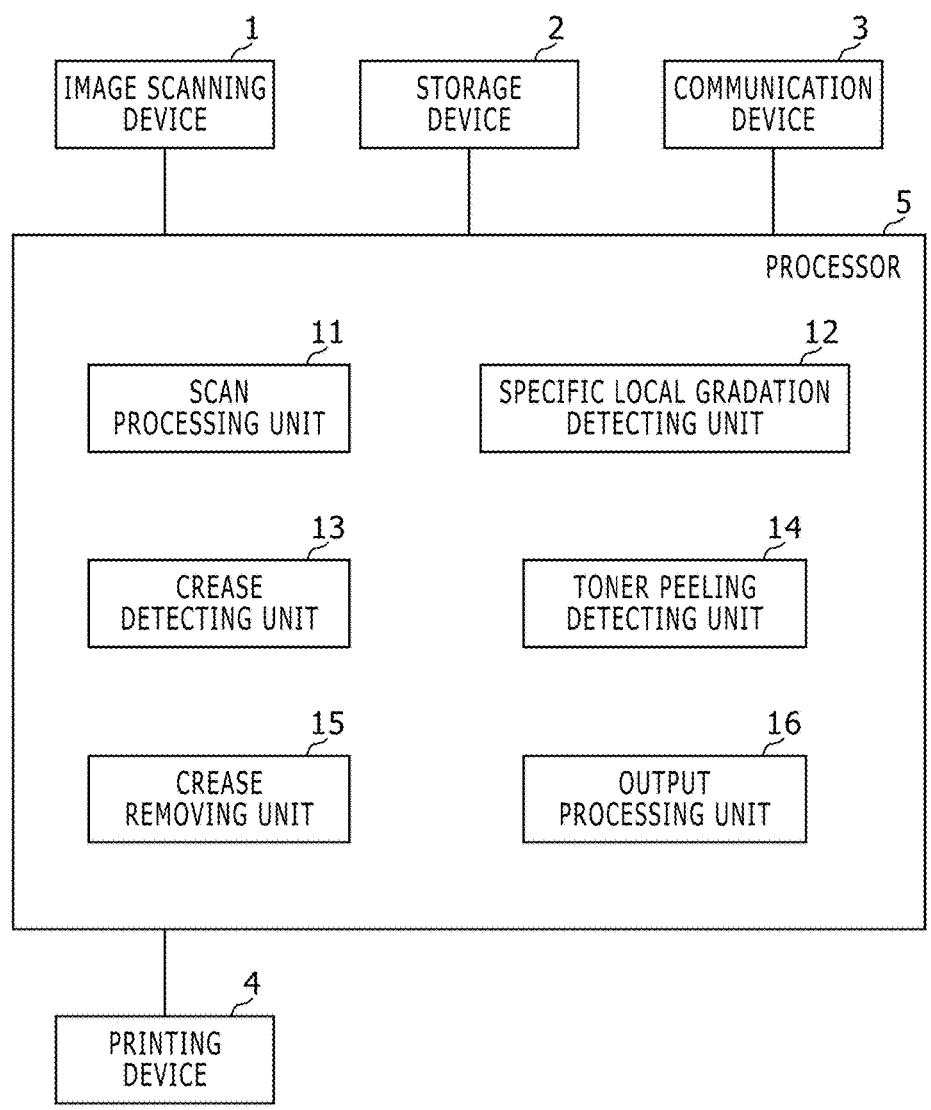
FIG. 1 shows a block diagram that indicates a configuration of an image processing apparatus according to an embodiment of the present invention.

FIG. 1 shows a block diagram that indicates a configuration of an image processing apparatus according to an embodiment of the present invention. The image processing apparatus shown in FIG. 1 includes an image scanning device 1, a storage device 2, a communication device 3, a printing device 4, and a processor 5.

The image scanning device 1 is an internal device that optically scans a document image of a document, and generates image data (RGB data, here) of the document image.

The storage device 2 is a device capable of storing data and programs. A non-volatile storage medium with a large capacity is used as the storage device 2, such as non-volatile memory or hard disk drive. The storage device 2 is enabled, for example, to store the image data of the document image.

The communication device 3 is a device which performs data communication with an external device. A network interface which performs network communication, a modem which performs facsimile communication or the like is used as the communication device 3.

The printing device 4 performs printing of a document image based on image data of the document image for which image processing has been processed such as color conversion and halftone process for printing.

The processor 5 is a computer that includes a CPU (Central Processing Unit), a ROM (Read Only Memory), a RAM (Random Access Memory) and the like, loads a program from the ROM or the storage device 2 to the RAM, and executes the program with the CPU and thereby embodies various processing units. In this embodiment, in the processor 5, a scan processing unit 11, a specific local gradation detecting unit 12, a crease detecting unit 13, a toner peeling detecting unit 14, a crease removing unit 15, and an output processing unit 16.

The scan processing unit 11 controls the image scanning device 1, and thereby obtains a document image and stores image data of the document image in the storage device 2, the RAM, or the like.

The specific local gradation detecting unit 12 reads image data of the document image, and detects a specific local gradation in a density distribution of a pixel array in a secondary scanning direction at each one of plural sampling positions (i.e. pixel positions) along a primary scanning direction in the document image.

Figure 2:
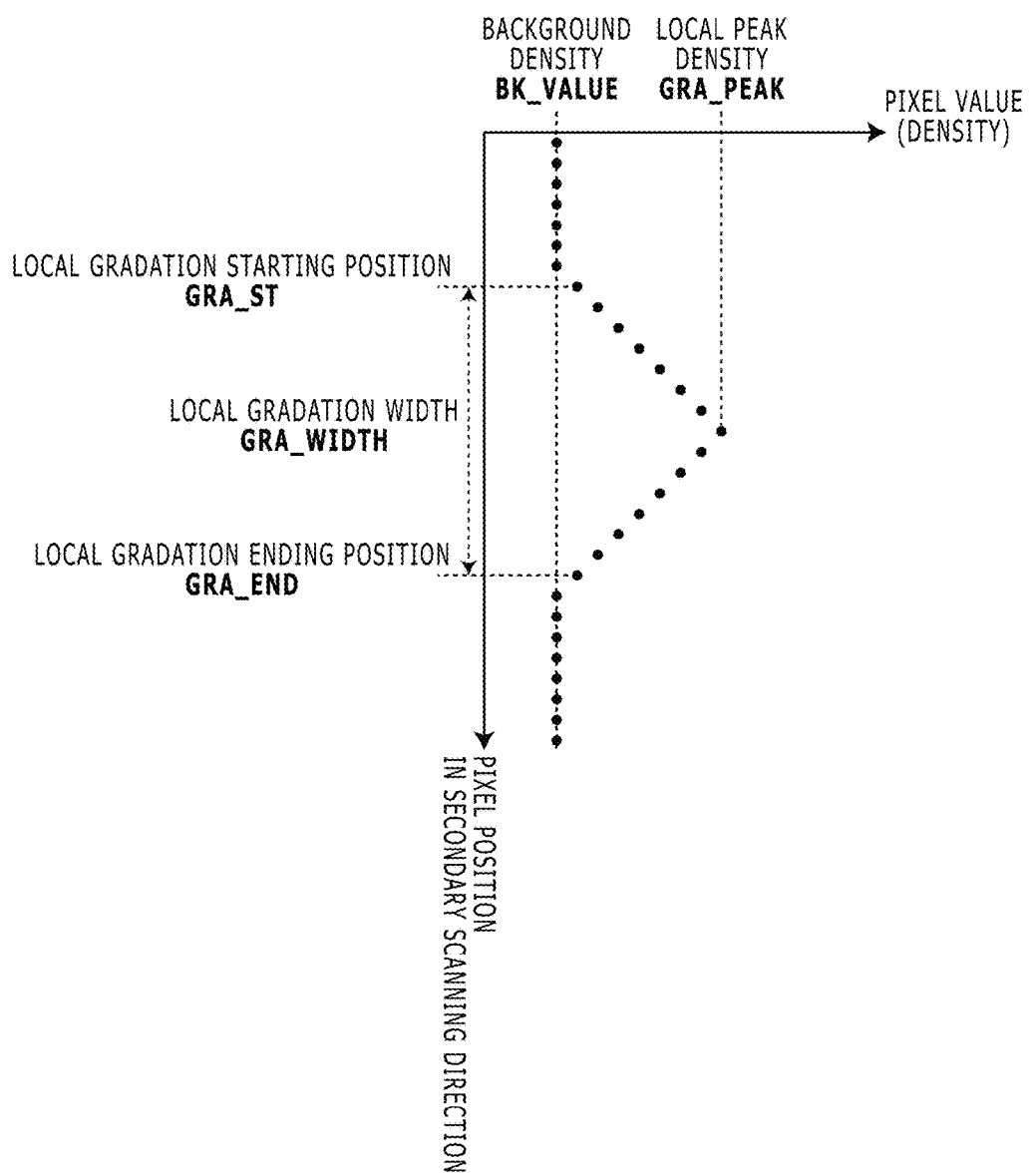
FIG. 2 shows a diagram that indicates an example of a density distribution of a specific local gradation.

FIG. 2 shows a diagram that indicates an example of a density distribution of a specific local gradation. As shown in FIG. 2, the aforementioned specific local gradation has a density distribution that monotonically increases from a background density BK_VALUE to a local peak density GRA_PEAK and monotonically decreases from the local peak density GRA_PEAK to the background density BK_VALUE in the secondary scanning direction.

The background density BK_VALUE is a surface density of a paper sheet of the document or a density of a background image of the document.

Therefore, for example, even if a section in the pixel array has a higher density than the background density but this section has a density distribution that includes plural peaks, then this section is not detected as a specific local gradation. Consequently, an image object such as photograph having density gradation tends not to be improperly detected as a crease.

Further, for example, even if a section in the pixel array has a higher density than the background density but this section includes plural successive pixels that have a peak density, then this section is not detected as a specific local gradation. Consequently, an image object such as character or line drawing that has a solid density tends not to be improperly detected as a crease.

The crease detecting unit 13 detects a crease in a document image. Specifically, the crease detecting unit 13 detects a crease on the basis of positions in the primary scanning direction and positions in the secondary scanning direction of plural specific local gradations detected by the specific local gradation detecting unit 12 for the plural sampling positions along the primary scanning direction.

More specifically, if the plural specific local gradations detected at plural sampling positions in the primary scanning direction linearly lay, the crease detecting unit 13 detects as a crease a linear part that passes at positions of the plural specific local gradations.

For example, this linear part is an area between a straight line that passes starting positions GRA_ST (see FIG. 2) of the respective plural specific local gradations detected at the plural sampling positions and a straight line that passes ending positions GRA_END (see FIG. 2) of the respective plural specific local gradations detected at the plural sampling positions.

Further, the crease detecting unit 13 determines a set of specific local gradations at the respective plural sampling positions so that the specific local gradations have (a) starting positions GRA_ST in the secondary scanning direction that agree with each other within a predetermined error, (b) widths GRA_WIDTH in the secondary scanning direction that agree with each other within a predetermined error, and (c) the local peak densities GRA_PEAK that agree with each other within a predetermined error; and detects a crease on the basis of positions in the primary scanning direction and positions in the secondary scanning direction of the specific local gradations that belong the determined set.

When the crease detecting unit 13 determines plural sets of specific local gradations at the respective plural sampling positions in the aforementioned manner, the crease detecting unit 13 detects plural creases corresponding to the respective determined plural sets.

Even if at a part of the sampling positions, the crease detecting unit 13 does not detect the specific local gradation that has (a) the starting position GRA_ST that agrees within a predetermined error, (b) the width GRA_WIDTH that agrees within a predetermined error, and (c) the local peak density GRA_PEAK that agrees within predetermined error (namely, does not detect a specific local gradation that has the substantially same density distribution as others), but the number of sampling positions at which specific local gradations with the substantially same density distributions are detected exceeds a predetermined threshold value GRA_SAMPLE_NUM, then the crease detecting unit 13 may determine a set of the detected specific local gradations with the substantially same density distributions, and may detect a crease on the basis of positions in the primary scanning direction and positions in the secondary scanning direction of the specific local gradations that belong the determined set.

Therefore, in this case, if the number of sampling positions at which specific local gradations with the substantially same density distributions are detected is equal to or less than the predetermined threshold value GRA_SAMPLE_NUM, then a crease is not detected corresponding to the detected specific local gradations with the substantially same density distributions.

Figure 3:
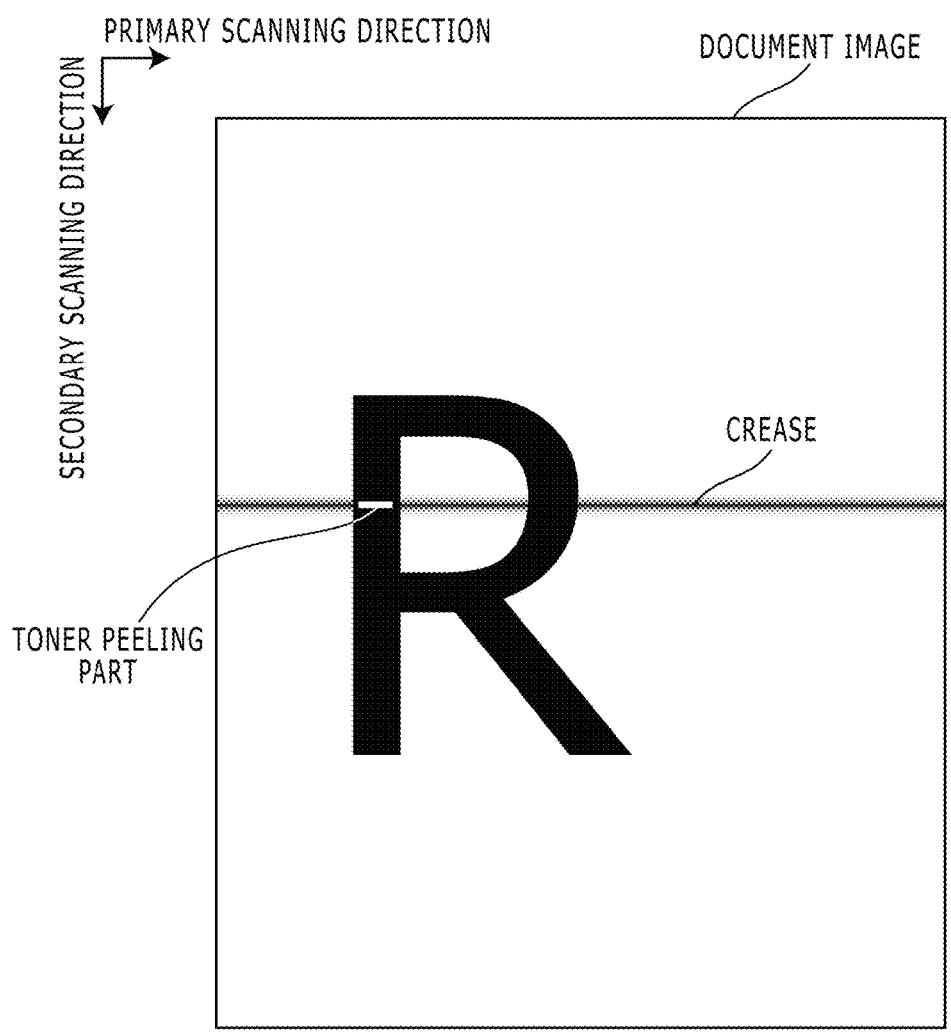
FIG. 3 shows a diagram that indicates an example of a toner peeling part that appears in a document image.

Along the detected crease, the toner peeling detecting unit 14 detects a toner peeling part on the crease. FIG. 3 shows a diagram that indicates an example of a toner peeling part that appears in a document image. If a part of a toner image fixed on a document is peeled, as shown in FIG. 3, a toner peeling part appears both on an object and on a crease in a document image.

Specifically, if on a detected crease a pixel area having a width of the predetermined number of pixels (e.g. 1 pixel or 2 pixels) in a direction perpendicular to the crease has a background color, and both sides of the pixel area are adjacent to at least two pixels in a direction perpendicular to the crease and the at least two pixels have a color other than the back ground color, then a toner peeling detecting unit 14 detects this pixel area as a toner peeling part and corrects a pixel value of the toner peeling part on the basis of pixel values of at least two pixels adjacent to both sides of the pixel area. Contrarily, a pixel value of a pixel area that is not detected as a toner peeling part is not changed.

Therefore, if differences between a pixel value of the aforementioned pixel area and pixel values of at least two pixels adjacent to both sides of the pixel area are equal to or less than a predetermined value, then it is not determined that this pixel area is a toner peeling part.

Figure 4:
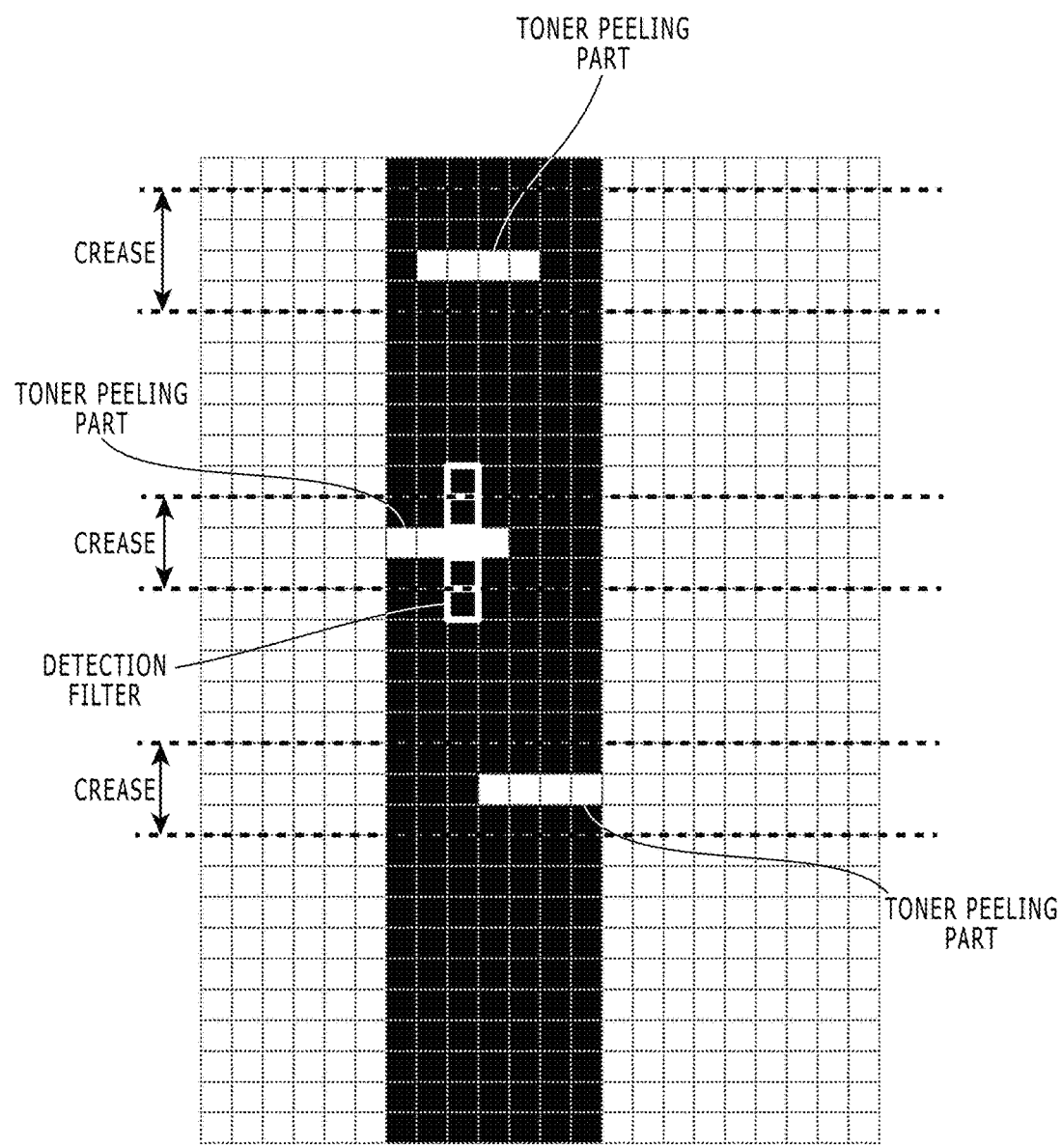
FIG. 4 shows a diagram that explains detection and correction of a toner peeling part performed by a toner peeling detecting unit 14 shown in FIG. 1.

FIG. 4 shows a diagram that explains detection and correction of a toner peeling part performed by a toner peeling detecting unit 14 shown in FIG. 1. For example, for detecting a toner peeling part with a one-pixel width, as shown in FIG. 4, the toner peeling detecting unit 14 uses a detection filter of 5 pixels, for example, and if a target pixel as a center has a background color and all of adjacent residual 4 pixels have a color other than the background color, then it is determined that the target pixel belongs to a toner peeling part. Subsequently, when it is determined that the target pixel belongs to a toner peeling part, the toner peeling detecting unit 14 changes a pixel value of the target pixel to an average value of pixel values of the 4 pixels other than a pixel at the center of the detection filter. Instead of the detection filter of 5 pixels, a detection filter of 3 pixels or a detection filter of 7 pixels or more may be used.

The width of the aforementioned pixel area and the size of the detection filter are specified as setting data by a user or the like.

It should be noted that the background color is a surface material color of a paper sheet of the document (e.g. white) or a color of a background image in the document. The background color is determined on the basis of colors (i.e. pixel values) of plural lines without any objects (e.g. in a blank part) in the document image.

Further, in this embodiment, if a density distribution of the crease has a low density gradient in a direction perpendicular to the crease, then the toner peeling detecting unit 14 excludes the crease from a detection target to detect the toner peeling part. In other words, if the density gradient is low, the crease on the document is probably slight and toner peeling hardly appears, and therefore, such a crease is excluded from a detection target of a toner peeling part. Specifically, if (a) a peak density (the aforementioned local peak density GRA_PEAK) is less than a predetermined value in the density distribution of the crease or (b) a width of the density distribution of the crease (the aforementioned local gradation width GRA_WIDTH) exceeds a predetermined value, then the toner peeling detecting unit 14 excludes the crease from a detection target to detect the toner peeling part.

Further, the toner peeling detecting unit 14 corrects a pixel value of the toner peeling part by changing the pixel value to an average value of the at least two pixel adjacent to both sides of the pixel area. Consequently, the toner peeling is removed in the document image.

The crease removing unit 15 removes the crease detected by the crease detecting unit 13. For example, the crease removing unit 15 replaces a density of the detected crease (i.e. a part having a higher density than a density of its neighborhood) with a density of neighborhood pixels (i.e. background pixels) or with a density obtained by interpolation between neighborhood pixels and thereby removes the crease.

For the document image in which such a toner peeling part has been removed and such a crease has been removed, the output processing unit 16 performs image processing necessary for printing such as color conversion (here, color conversion from RGB to CMYK) and halftone process (e.g. binarization process using an error diffusion method), and causes the printing device 4 to perform printing of the document image based on image data of the document image after the image processing.

Further, using the communication device 3, the output processing unit 16 may transmit to an external device the image data of the document image in which such a toner peeling part has been removed and such a crease has been removed.

Figure 5:
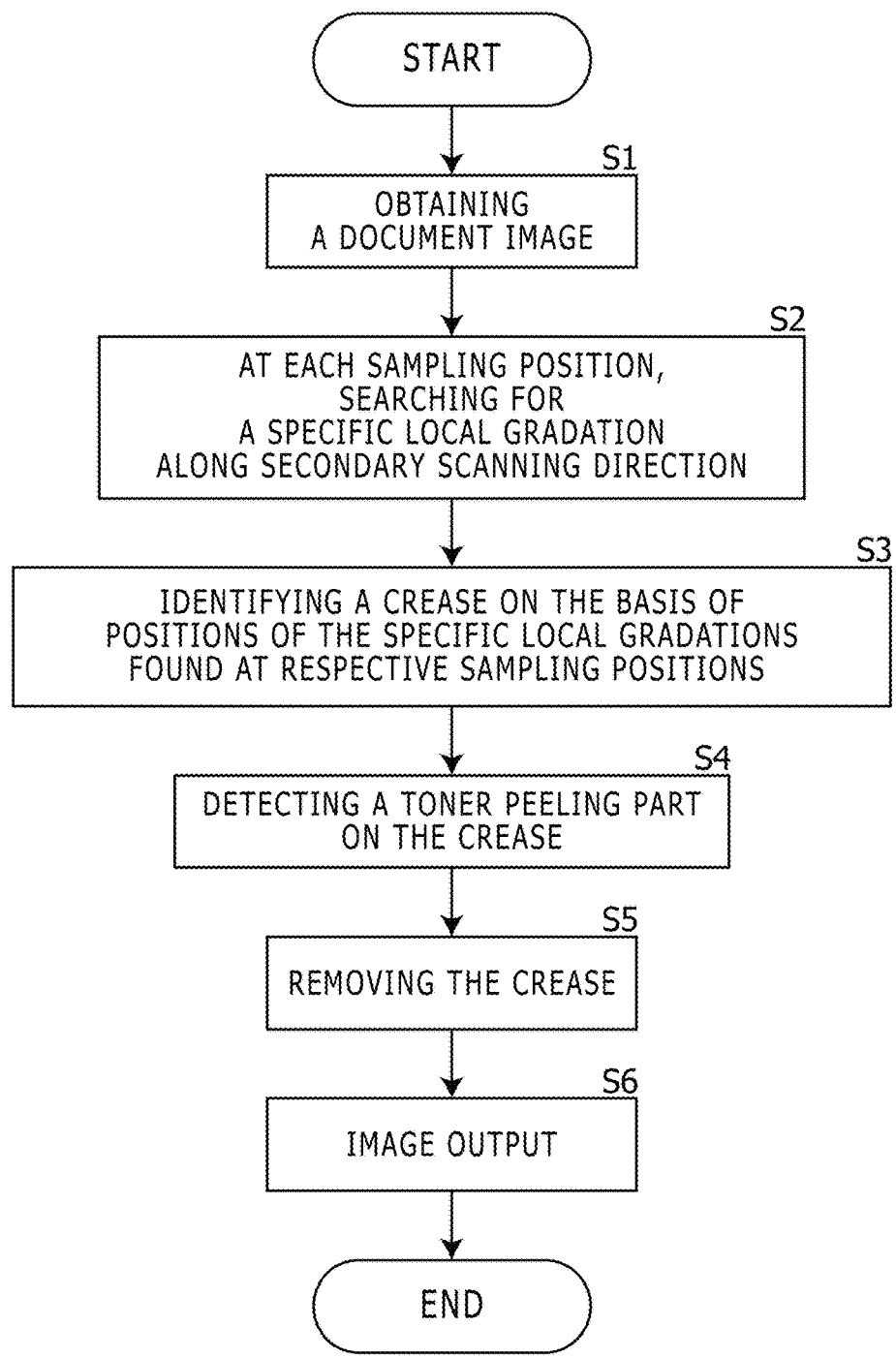
FIG. 5 shows a flowchart that explains a behavior of the image processing apparatus shown in FIG. 1.

The following part explains a behavior of the aforementioned apparatus. FIG. 5 shows a flowchart that explains a behavior of the image processing apparatus shown in FIG. 1.

When detecting a predetermined user operation using an unshown operation panel, the scan processing unit 11 controls the image scanning device 1 and thereby obtains a document image of a document set on the image scanning device 1 and stores image data of the document image in the storage device 2, the RAM, or the like (in Step S1).

Subsequently, at each one of predetermined sampling positions along a primary scanning direction in the document image, the specific local gradation detecting unit 12 extracts pixel values (i.e. densities) of a pixel array in a secondary scanning direction for the image data of the document image, searches a density distribution of the pixel array for a specific local gradation in the secondary scanning direction, and thereby detects a specific local gradation (in Step S2).

Figure 6:
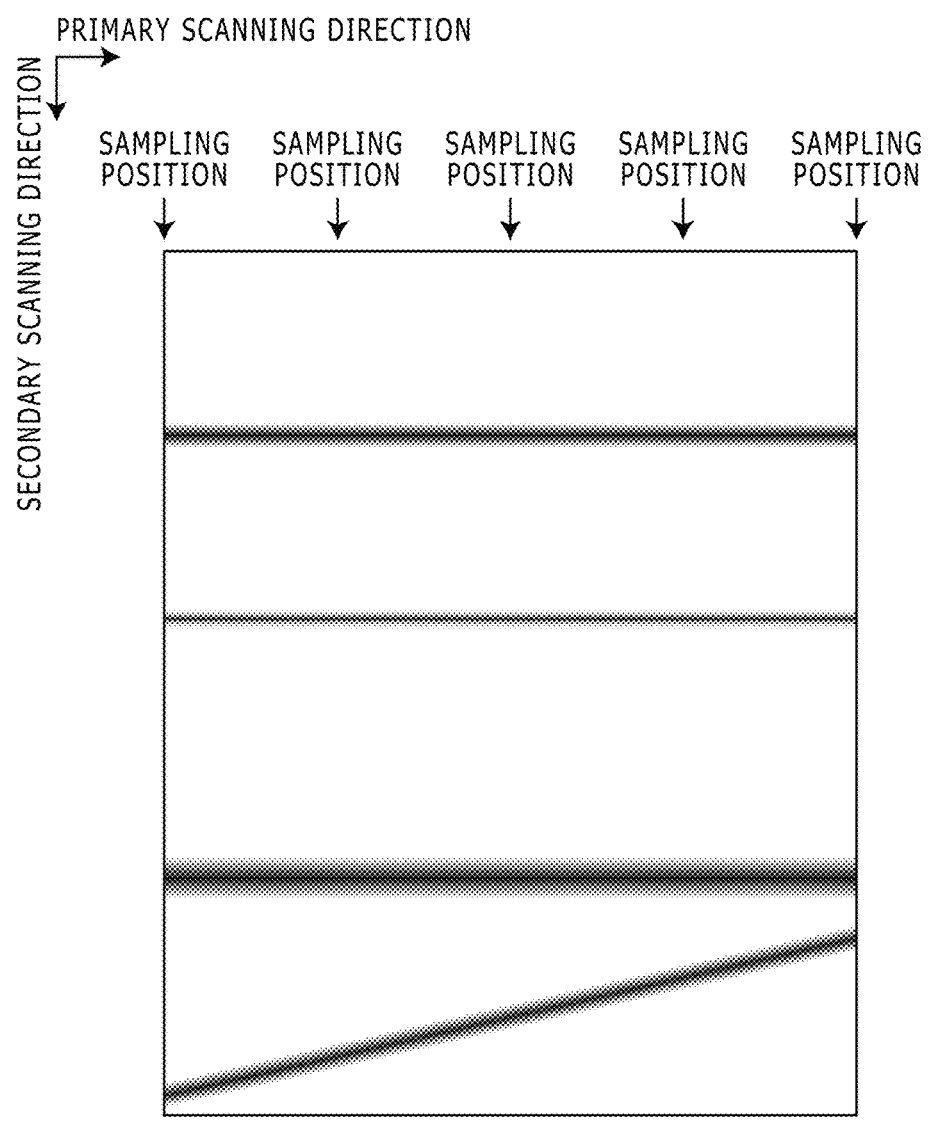
FIG. 6 shows a diagram that indicates an example of a document image that includes a crease.

FIG. 6 shows a diagram that indicates an example of a document image that includes a crease. FIG. 7 shows a diagram that indicates an example of a specific local gradation detected in the document image shown in FIG. 6. For example, a document image shown in FIG. 4 includes four creases, and specific local gradations are detected at each one of five sampling positions including both ends of the document image. In FIG. 5, the number of the sampling positions are 5. Alternatively, the number of the sampling positions may be another amount more than 1. In this case, as shown in FIG. 7, at each one of the sampling positions, four specific local gradations are detected. Specifically, at the sampling position #1, the specific local gradations 51-1 to 51-4 are detected; at the sampling position #2, the specific local gradations 52-1 to 52-4 are detected; at the sampling position #3, the specific local gradations 53-1 to 53-4 are detected; at the sampling position #4, the specific local gradations 54-1 to 54-4 are detected; and at the sampling position #5, the specific local gradations 55-1 to 55-4 are detected.

Subsequently, the crease detecting unit 13 detects a crease in the aforementioned manner on the basis of positions in the primary scanning direction and positions in the second scanning direction of the plural specific local gradations detected at the respective plural sampling positions (in Step S3).

For example, as shown in FIG. 7, if the specific local gradations 51-1 to 51-4, 52-1 to 52-4, 53-1 to 53-4, 54-1 to 54-4 and 55-1 to 55-4 as shown in FIG. 7 are detected, then a crease 61 is detected on the basis of the specific local gradations 51-1, 52-1, 53-1, 54-1 and 55-1 that have substantially same density distributions as each other, a crease 62 is detected on the basis of the specific local gradations 51-2, 52-2, 53-2, 54-2 and 55-2 that have substantially same density distributions as each other, a crease 63 is detected on the basis of the specific local gradations 51-3, 52-3, 53-3, 54-3 and 55-3 that have substantially same density distributions as each other, a crease 64 is detected on the basis of the specific local gradations 51-4, 52-4, 53-4, 54-4 and 55-4 that have substantially same density distributions as each other, and a crease 65 is detected on the basis of the specific local gradations 51-5, 52-5, 53-5, 54-5 and 55-5 that have substantially same density distributions as each other.

After detecting a crease in the document image as mentioned, the toner peeling detecting unit 14 detects and corrects a toner peeling part in a line of the detected crease in the aforementioned manner (in Step S4).

Subsequently, the crease removing unit 15 removes the crease detected by the crease detecting unit 13 (in Step S5).

The output processing unit 16 performs (a) printing of the document image in which a crease has been removed and/or (b) transmission of image data of the document image in which a crease has been removed (in Step S6).

As mentioned, in this embodiment, the crease detecting unit 13 detects a crease in a document image. If on the detected crease a pixel area having a width of the predetermined number of pixels in a direction perpendicular to the crease has a background color, and both sides of the pixel area are adjacent to at least two pixels in a direction perpendicular to the crease and this at least two pixels have a color other than the back ground color, then a toner peeling detecting unit 14 detects this pixel area as a toner peeling part and corrects a pixel value of the toner peeling part on the basis of pixel values of at least two pixels adjacent to both sides of the pixel area.

Consequently in the document image, the toner peeling part that appears on a crease is corrected.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the specific local gradation may be limited to a pixel array section that has a density of a pixel at a starting position of the section where a difference between the background density and the density of the pixel at the starting position is equal to or less than a predetermined threshold value. In such a case, if the difference between the background density and the density of the pixel at the starting position exceeds the predetermined threshold value in a pixel array section, then such a pixel array section is not detected as a specific local gradation.

Further, the specific local gradation may be limited to a pixel array section that has the local peak density that is equal to or less than a predetermined threshold value. In such a case, if the local peak density exceeds the predetermined threshold value in a pixel array section, then such a pixel array section is not detected as a specific local gradation.

Further, in the aforementioned embodiment, in addition to a crease in the primary scanning direction and an oblique crease as mentioned, the specific local gradation patter detecting unit 12 and the crease detecting unit 13 may detect a crease in the secondary scanning direction in the same manner, and along the crease in the secondary scanning direction, the toner peeling detecting unit 14 may detect a toner peeling part on the crease.

Furthermore, in the aforementioned embodiment, the detection method of the crease is not limited to the aforementioned method.

INDUSTRIAL APPLICABILITY

For example, the present invention is applicable to an image forming apparatus such as a multi function peripheral.

The invention claimed is:

1. An image processing apparatus, comprising:
   a crease detecting unit that detects a crease in a document image; and
   a toner peeling detecting unit that (a) detects as a toner peeling part a pixel area on the crease, the pixel area (a1) having a width of the predetermined number of pixels in a direction perpendicular to the crease, (a2) having a background color, and (a3) of which both sides are adjacent to at least two pixels in a direction perpendicular to the crease, the at least two pixels having a color other than the back ground color, and (b) corrects a pixel value of the toner peeling part on the basis of pixel values of at least two pixels adjacent to both sides of the pixel area.

2. The image processing apparatus according to claim 1, wherein the toner peeling detecting unit excludes the crease from a detection target to detect the toner peeling part if a density distribution of the crease has a low density gradient in a direction perpendicular to the crease.

3. The image processing apparatus according to claim 2, wherein the toner peeling detecting unit excludes the crease from a detection target to detect the toner peeling part if (a) a peak density is less than a predetermined value in the density distribution of the crease or (b) a width of the density distribution of the crease exceeds a predetermined value.

4. The image processing apparatus according to claim 1, further comprising a specific local gradation detecting unit that detects a specific local gradation in a density distribution of a pixel array in a secondary scanning direction at each one of plural sampling positions along a primary scanning direction in the document image;
   wherein the crease detecting unit detects a crease on the basis of positions in the primary scanning direction and positions in the secondary scanning direction of plural specific local gradations detected by the specific local gradation detecting unit for the plural sampling positions along the primary scanning direction; and
   the specific local gradation has a density distribution that monotonically increases from a background density to a local peak density and monotonically decreases from the local peak density to the background density in the secondary scanning direction.

5. The image processing apparatus according to claim 1, wherein the toner peeling detecting unit corrects a pixel value of the toner peeling part by changing the pixel value to an average value of the at least two pixel adjacent to both sides of the pixel area.

\* \* \* \* \*